Figure 2:
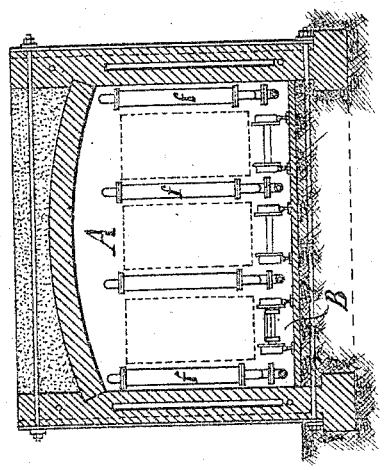

(No Model.) 6 Sheets—Sheet 1.

G. J. MÖLLER & P. PFEIFER.
DRYING AND EVAPORATING APPARATUS.

No. 548,573. Patented Oct. 22, 1895.

Witnesses
George Baumann
Edith J. Griswold

Inventors
Gustave J. Möller
Paul Pfeifer
By their Attorneys
Howson and Howson

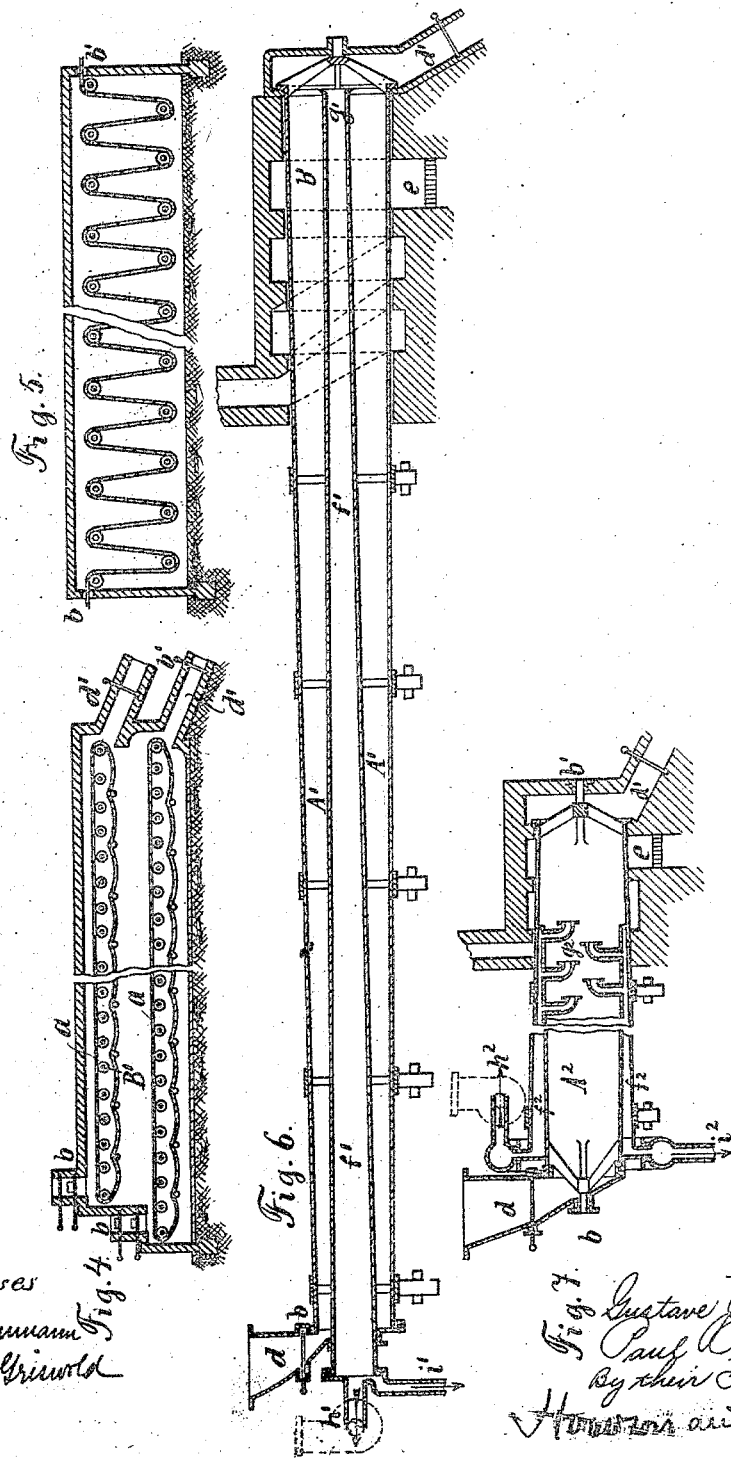

(No Model.) 6 Sheets—Sheet 3.

G. J. MÖLLER & P. PFEIFER.
DRYING AND EVAPORATING APPARATUS.

No. 548,573. Patented Oct. 22, 1895.

Witnesses

Inventors:
G. J. Möller and
Paul Pfeifer
By their attorneys (No Model.)
G. J. MÖLLER & P. PFEIFER.
DRYING AND EVAPORATING APPARATUS.
No. 548,573. Patented Oct. 22, 1895.
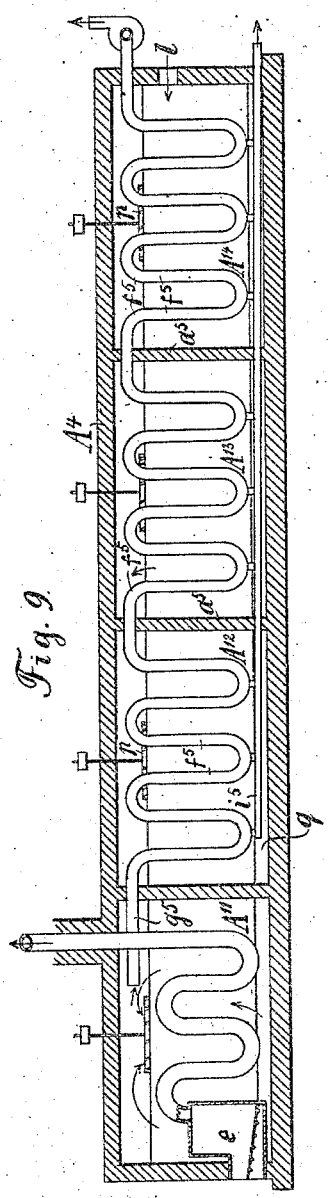
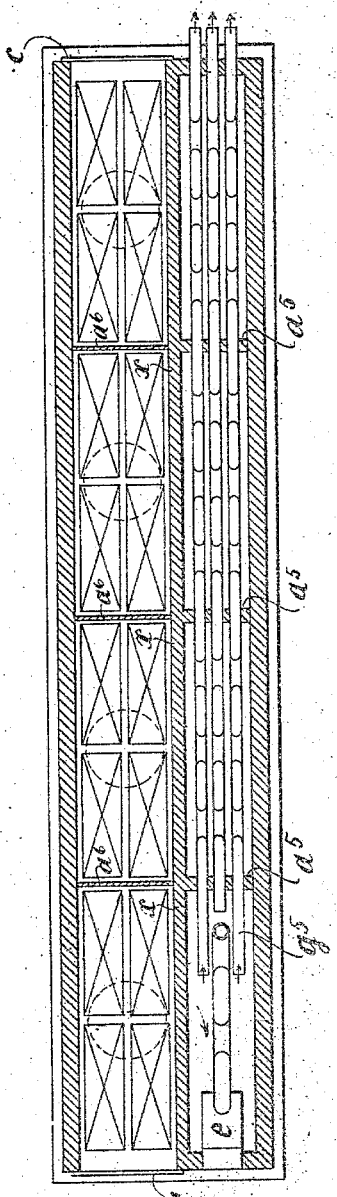
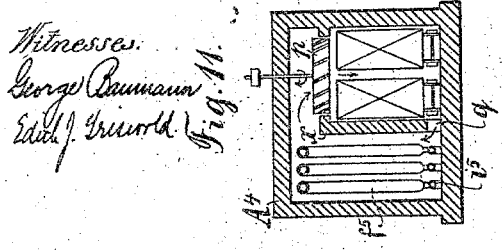

(No Model.) 6 Sheets—Sheet 5.

G. J. MÖLLER & P. PFEIFER.
DRYING AND EVAPORATING APPARATUS.

No. 548,573. Patented Oct. 22, 1895.

Witnesses
George Baumann
Edith J. Griswold

Inventors
Gustave J. Möller
Paul Pfeifer
By their Attorneys
Howson and Howson (No Model.) 6 Sheets—Sheet 6.

G. J. MÖLLER & P. PFEIFER.
DRYING AND EVAPORATING APPARATUS.

No. 548,573. Patented Oct. 22, 1895.

Witnesses
George Baumann
Edith J. Griswold

Inventors:
Gustave J. Möller
Paul Pfeifer
By their Attorney

United States Patent Office.

GUSTAVE J. MÖLLER, OF BERLIN, AND PAUL PFEIFER, OF BRUNSWICK, GERMANY.

DRYING AND EVAPORATING APPARATUS.

SPECIFICATION forming part of Letters Patent No. 548,573, dated October 22, 1895.

Application filed July 19, 1894. Serial No. 518,064. (No model.)

*To all whom it may concern:*

Be it known that we, GUSTAVE J. MÖLLER, of 19 Friedrich-Wilhelmstrasse, Berlin, and PAUL PFEIFER, of Brunswick, Germany, subjects of the Emperor of Germany, have invented Improvements in and relating to Drying and Evaporating Apparatus, of which the following is a specification.

Our invention relates to drying and evaporating apparatus.

By means of our improved apparatus any moist materials or liquids are artificially dried or evaporated in such a manner that the latent and free heat inherent in the water escaping as steam from the material during the drying or in the vapors escaping from the liquid is recovered by the condensation of the said steam or vapors and utilized for drying. The heat of the water of condensation which is still hot is used in like manner.

In the drying apparatus heretofore employed the material to be dried is subjected to an air-current whose capacity for taking up water is increased by direct heating. The latent and free heat inherent in the steam escaping from the material is, however, lost.

At the hot end of the drying-chamber, where the fireplace is built, a vaporization of the water in the materials to be dried takes place by means of heat outside. Of the heat used for this purpose, apart from the loss by radiation, about five-sixths is used for changing the water into steam (latent heat of the steam) and about one-sixth for direct heating, (fire heat.) To regain these two kinds of heat for the drying is the essential object of the present invention.

According to our aforesaid invention the heat of the steam escaping from the material to be dried is utilized by drawing it from the hottest point of the drying-chamber and using it by means of suitable pipes for heating the colder parts of the drying-chamber.

Various constructional forms or arrangements of such drying apparatus are represented in the accompanying drawings, in which—

Figure 1:
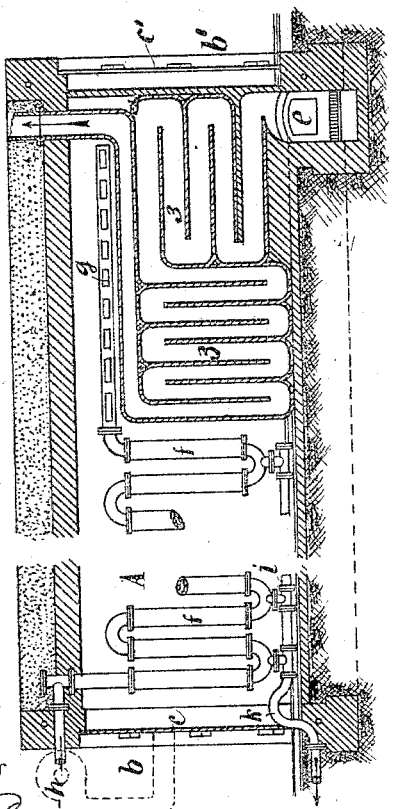
Figure 3:
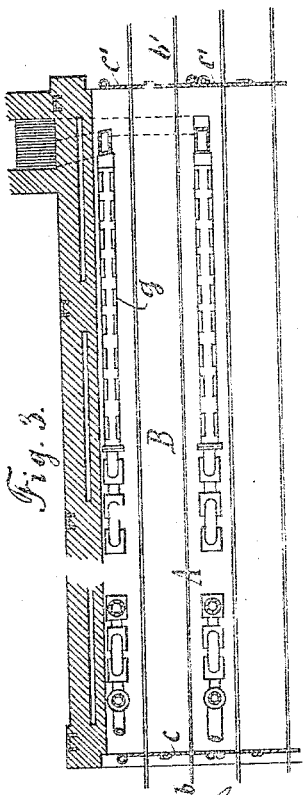
Figure 12:
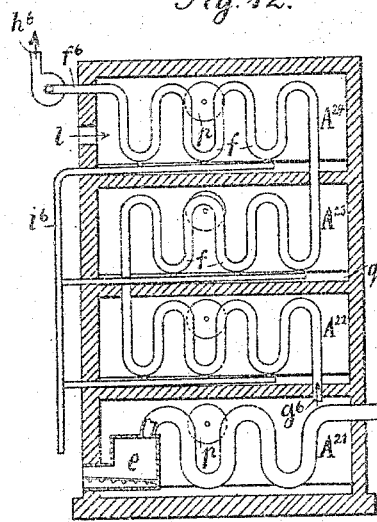
Figure 13:
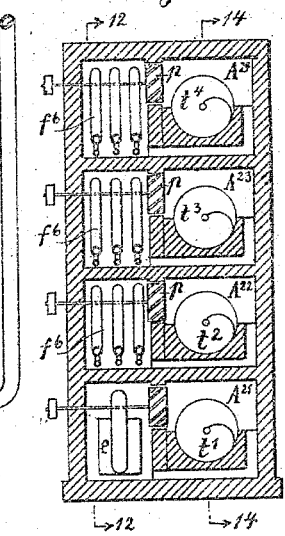
Figure 14:
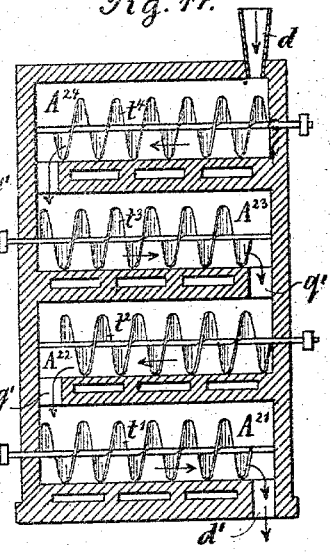
Figure 15:
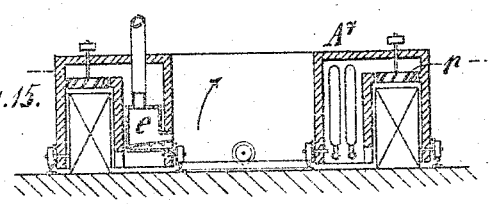
Figure 17:
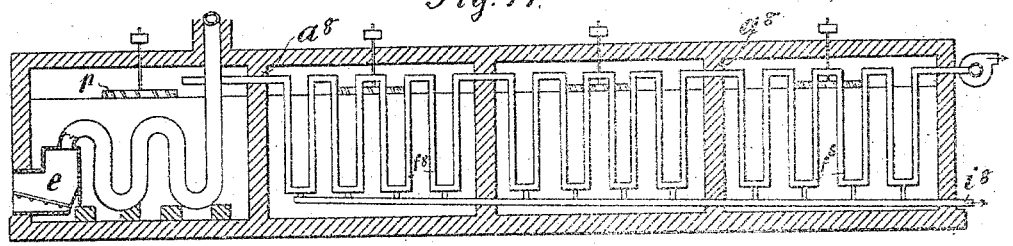
Figure 18:
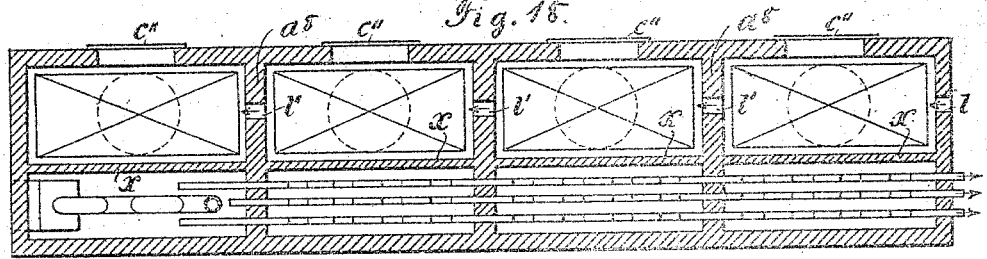
Figure 20:
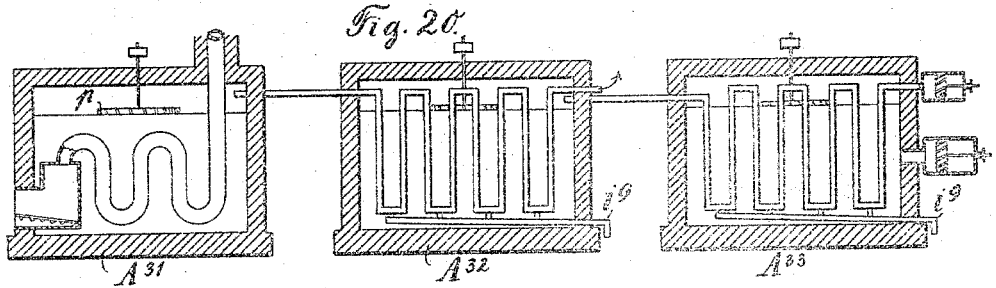
Figure 21:
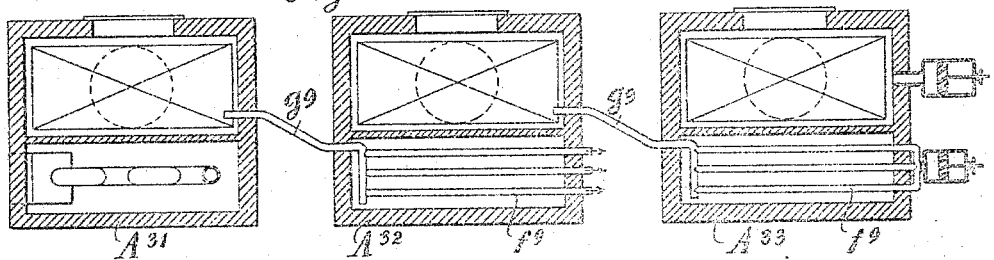
Figure 19:
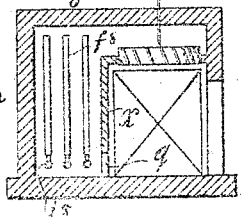
Figure 22:
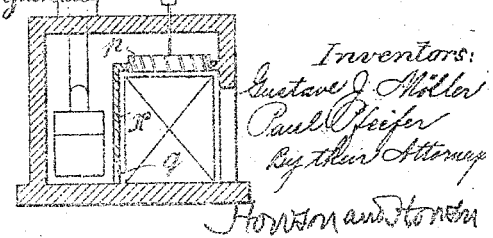

Figure 1 is a longitudinal section, Fig. 2 is a cross-section, and Fig. 3 a sectional plan, of an apparatus constructed according to our invention. Figs. 4, 5, 6, 7, and 8 are longitudinal sections representing modified constructions embodying the same principle. Fig. 9 is a longitudinal section, Fig. 10 a horizontal section, and Fig. 11 a cross-section, of a further modification. Fig. 12 is a longitudinal section showing a further modification, taken on line 12 12 of Fig. 13. Fig. 13 is a transverse section, and Fig. 14 a longitudinal section taken on line 14 14 of Fig. 13. Fig. 15 is a transverse section, and Fig. 16 a sectional plan, of another form. Figs. 17, 18, and 19 are views similar to Figs. 9, 10, and 11, showing a further modification; and Figs. 20, 21, and 22 show another modification.

In the arrangement shown in Figs. 1 to 3 we provide a drying-channel A, adapted to be closed at its two extremities by doors $c$ $c'$. The material to be dried is placed upon trucks running upon rails B and is moved by steps through the said drying-channel.

At the end of the drying-channel, where the dried materials leave the same, is arranged a furnace $e$, the heating-gases from which pass through heating-pipes having many bends 3 and arranged in the drying-channel, and are then conducted to the outside. By this furnace the drying-channel is heated to such a degree that all the water to be removed from the material will be evaporated.

In the part of the drying-channel which is heated most strongly we arrange suction-pipes $g\,f$, through which the water evaporated from the material to be dried is drawn and conveyed to the outside at $h$. On its way through the pipe $f$, made of suitable shape and extended as much as practicable, the steam condenses on the metallic walls of this pipe, thus yielding its latent and free heat to the material to be dried. The outlet end $h$ of the pipe leads to a fan, chimney, or the like. In the drawings a fan is shown in dotted lines.

The water condensed in the pipe $f$ is conducted in a special water-pipe $i$ to the coldest end of the channel, and is there removed through an overflow-pipe $k$ or through any other suitable water-seal. The pipe for conducting the water of condensation is also arranged so that the free heat of this water will be given off to the material to be dried.

In Fig. 4 is represented an apparatus specially designed for drying granular or pulverulent material. For transporting the material to be dried we use in this case two endless bands a, which pass over the carrying-rollers B', and are set in motion by any suitable device. The arrangement of the heating-pipes and the like is similar to that represented in Figs. 1 to 3. For drying fabrics, paper, and the like in great lengths the material to be dried may be conducted through the drying-channel in the manner illustrated in Fig. 5. In these figures we have applied the letter b to the cool end of the apparatus and the letter b' at the heated end.

A drying apparatus provided with a rotary drum is represented in Fig. 6. The material to be dried passes from the hopper d into the drum A', adapted to rotate about a horizontal axis and made of conical shape, and the material leaves the drum through the pipe d'. At the end b' of the drum, where the material to be dried leaves the drum, is provided a furnace e, the heating-gases from which circulate around the drum in several windings. The steam escaping from the material to be dried is drawn away at the hottest point of the drum at g', through the central pipe f', which is in connection with a suction device at h'. In the pipe f' the steam condenses, yielding its heat to the material to be dried. The water of condensation flows off at i' at the front end of the drum.

In Fig. 7 is represented a similar arrangement which differs from that shown in Fig. 6 only by the fact that the condensing-chamber $f^2$ is not in the interior of the drum, but surrounds the same, so as to form a casing or jacket. In this case the vapor is drawn from the heating-chamber $A^2$ into the condensing-chamber $f^2$ through the pipes or passages $g^2$, the suction being applied at $h^2$ and the water of condensation passing off at $i^2$.

Figure 8:
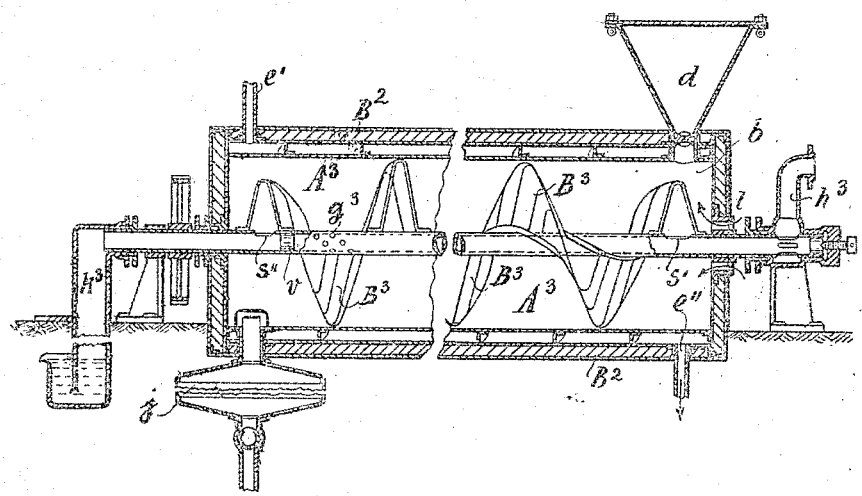

Another arrangement which is represented in Fig. 8 comprises a stationary metallic drum $A^3$, surrounded by a casing $B^2$. In the intermediate space between the drum and the casing the heating takes place by heat introduced from the outside. The heating-gases pass at e' into the intermediate space, circulate in spiral windings around the drum $A^3$, and escape at e''. The material to be dried is fed into the drum at the end b by means of the funnel d and moved by the conveyer $B^3$ to the other end of the drum, where it leaves through the discharging device j. The steam escaping from the material to be dried is sucked at $g^3$ into the hollow shaft of the conveyer and circulates through the hollow conveyer, on the walls of which it condenses, thus giving off its heat. The condensed water passes through the conveyer and is conducted in the cooled state by the conveyer into the shaft and to the water-outlet $k^3$. A water-column at this outlet balances the suction-power at $h^3$.

As the latent and free heat inherent in the evaporated water will almost always be greater than the heat necessary for the exclusive preliminary heating of the material, including replacing the unavoidable losses, it is not possible with the drying apparatus hereinbefore described to work with the air completely shut off if all the heat is to be recovered. In fact, it is needful to provide, at the end of the drying-chamber where the material is introduced, air-holes to be specially regulated—for instance, like those represented at l, Fig. 8. Through these holes a moderate regulated air-current must be conducted through the drying-chamber in the same direction as the material to be dried, and then through the condensing device in the opposite direction. By this means an energetic vaporization of water will be caused in the part of the drying-chamber heated, not directly, but by condensing-bodies. This air which enters at the cold end of the drying-chamber becomes gradually hotter, and takes up water, until it becomes supersaturated in the hottest part of the drying-chamber—that is to say, becomes mixed with steam. In its return passage through the condensing device the air, owing to the same, is then freed again from most of the water previously taken up; but it is still saturated with water when removed from the apparatus. A loss would thus be occasioned, for the outer air cannot be regarded as being saturated with water. In order to obviate this loss, the opening through which the suction device expels this air may be set in communication with the cooler end of the drying-chamber itself, so that no more fresh air will enter from the outside, but that the same air will circulate continually from the cold end of the drying-chamber to the hot end and then through the condensing device back again to the cold end. (See dotted lines in Fig. 1.)

In the drying apparatus hereinbefore described the heating-bodies and the material to be dried are in the same room. We may, however, separate the heating-bodies from the material to be dried and from several chambers, the partitions being provided with apertures through which the air is forced in a continuous cycle, with a slow forward movement, to the next chamber, so that the heat will be better utilized. Figs. 9, 10, and 11 show such an arrangement.

The drying-chamber $A^4$ is divided throughout its length by a partition x into two parts, in one of which the heating-bodies are arranged, while in the other the material to be dried is placed. The room designed for the heating-bodies is divided by partitions $a^5$ into several compartments $A^{11}$ $A^{12}$ $A^{13}$ $A^{14}$. We may also arrange partitions $a^6$, Fig. 10, in the material to be dried, which partitions are transported with the material through the channel.

The room for the material to be dried is closed above, except where an opening is left for a fan p, provided for each of the compartments $A^{11}$ $A^{12}$ $A^{13}$ $A^{14}$, which fan causes the heated air to pass from the compartment through the material to be dried. After the air has passed through the material and has given off its heat to the same it returns through apertures $q$ to the heating-chamber, where it is heated again. Accordingly the air in the several compartments formed by the transverse walls describes a continuous cycle from the heating-bodies to the material to be dried and from this material back again to the heating-bodies. As through openings $l$, provided at the cold end of the apparatus, a very slow regulated air-current passes through the entire drying-channel from the cold to the hot end, the air will be conveyed in very short spiral windings through the drying-channel, so that the heat is given off in a very complete manner.

Instead of effecting the separation of the several compartments by partitions, the compartments may also be separated by spaces from each other, the communication between them being established by suitable channels.

The several rooms, instead of being side by side, may also be arranged one above the other. Such an arrangement is particularly designed for drying pulverulent or granular substances or for evaporating liquid substances. Figs. 12, 13, and 14 are longitudinal and transverse sections, of the same, Fig. 12 showing a section through the heating-chamber and Fig. 14 a section through the drying-chamber. In this arrangement we provide, for instance, four compartments $A^{21}$ $A^{22}$ $A^{23}$ $A^{24}$, one above the other, each of them being divided by a longitudinal partition into two rooms, one of which serves for the heating device and the other for the material to be dried.

In each partition is arranged a fan $p$, which forces the air from the heating-room into the drying-room, whereupon it returns through a channel $q$ into the heating-room. In the lowest compartment is arranged the furnace $e$, the gases from which pass through the room in many windings and are then conducted to the outside. The vapor produced is drawn off through the pipe $g^6$ and then conducted by the pipe $f^6$ through all the heating-chambers. In each drying-room is a conveyer to feed forward the material to be dried or the liquid to be evaporated. The material to be dried or the liquid passes through the funnel $d$ into the upper drum $t^4$ and is conducted through the latter and falls through the aperture $q'$ into the drum $t^3$ below. In this manner the material to be dried is transported through all the drying-chambers until it leaves the apparatus through the opening $d'$, thus securing a full utilization of the heat.

The evaporation of liquids effected in this drying apparatus is essentially different from that which takes place in the apparatus heretofore used, in which the steam drawn from an evaporating-vessel is employed for heating a second evaporating-vessel. Whereas in the latter apparatus the heating-bodies are completely surrounded by the liquid to be evaporated, so that the heat is given off directly to the liquid, in the present apparatus the condensing-pipes heated by the waste steam yield their heat to the air surrounding them, this air being then brought into intimate contact with the liquid to be evaporated. The liquid is moreover transported either continually or periodically, in order to pass gradually from the coldest to the hottest part of the apparatus, the evaporation being considerably accelerated by the continuous cycle of the air.

Figure 16:
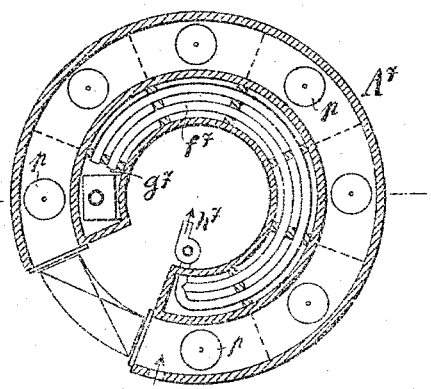

Figs. 15 and 16 represent an apparatus in which the material to be dried is stationary, while the drying device is moved. The apparatus consists in this case of a circular chamber $A^7$, adapted to run on rails and divided by a concentric partition into an inner and an outer compartment. By radial partitions we provide several chambers in which the fans $p$ maintain a continuous cycle of the air from the heating-chamber into the drying-chamber and back again. The material to be dried is likewise arranged in a cycle, so that in the slow-turning movement of the drying device the hottest part of the same will be caused to pass slowly over each portion of the material.

In lieu of the partitions which are moved with the material to be dried through the drying-channel we may also arrange fixed partitions in the same, so that it is divided into several chambers. Such an arrangement is represented in Fig. 17 in vertical longitudinal section. Fig. 18 is a plan and Fig. 19 a vertical transverse section of this arrangement.

A drying-channel is provided throughout its length with the partitions $x$ and divided by the fixed partitions $a^8$ into a number of separate chambers. In each of these compartments we maintain by a fan $p$ a continuous cycle of the air from the heating-pipes to the material to be dried, and from the latter back again to the heating-pipes.

In order that the air-current passing through the aperture $l$ into the coldest chamber may flow in a regulated manner to the hottest end of the apparatus, we provide in the fixed partitions apertures $l'$, through which the air moves from the coldest to the hottest compartments in a continuous cycle in the several compartments. As in this arrangement the material to be dried cannot be transported by continuous motion through the whole drying-channel, each compartment is provided with a door $c''$, adapted to be closed, and through which the material can be introduced and discharged or brought from a colder to a warmer compartment.

Instead of arranging the several compartments directly side by side, they may be separated from each other by spaces, in which case channels or the like take the place of the apertures $l'$.

Fig. 20 is a vertical longitudinal section, Fig. 21 a plan, and Fig. 22 a vertical transverse section, representing this arrangement. In this arrangement, having several compartments $A^{31}$ $A^{32}$ $A^{33}$ separated from each other by spaces, the operation takes place with the exclusion of the outer air, so that the vapor generated in the first chamber $A^{31}$ from the material by direct heating is drawn off through the pipe $g^9$ and conducted through a condensing or heating body $f^9$ of the second chamber $A^{32}$, in which it condenses. The second chamber is completely shut off from the outer air and is only connected by the pipe $g^9$ with the condensing-body $f^9$ of the third chamber $A^{33}$, with which an air-pump or the like is connected for rarefying the air in the second chamber $A^{32}$, so that in this chamber $A^{32}$ the evaporation of the water from the material to be dried takes place at a lower temperature than in the first chamber $A^{31}$. From the last chamber the air is driven off directly from the drying-chamber.

We claim as our invention—

1. A drying apparatus comprising a drying channel, heating means at one end thereof, means for collecting the vapor driven off from the material and pipes or channels adjacent to the cooler part of the material in which the said vapor condenses, all substantially as and for the purposes set forth.

2. A drying apparatus comprising a drying channel, heating means at one end thereof, means for feeding the material through the channel from the cool to the hot end, means for collecting the vapor driven off from the material and pipes or channels adjacent to the cooler part of the material in which the said vapor condenses, substantially as set forth.

3. A drying apparatus comprising a drying channel, heating means at one end thereof and an air inlet at the opposite end, means for collecting the vapor driven off from the material and pipes or channels adjacent to the cooler part of the material, substantially as set forth.

4. A drying apparatus comprising a drying channel, heating means at one end thereof, and an air inlet at the opposite end, means for collecting the vapor driven off from the material, pipes or channels adjacent to the cooler part of the material in which the said vapor condenses, and means for leading the air separated from the vapor while condensing, to the said air inlet to the channel, all substantially as and for the purposes set forth.

5. A drying apparatus, comprising a drying channel, heating means at one end thereof, and an air inlet at the opposite end, means for circulating the air in a spiral direction from the cool to the heated end of the channel, means for collecting the vapor driven off from the material, and pipes or channels adjacent to the cooler material in which the said vapor condenses, substantially as set forth.

6. A drying apparatus comprising a channel divided into compartments, the compartment at one end being provided with heating means and the compartment at the other end with an air inlet, means for circulating the air in a spiral direction in each compartment and through the channel from the cool end to the heated end, means for collecting the vapor driven off from the material, and pipes or channels in which the said vapor condenses, passing through the channel from the heated end to the cool end, substantially as set forth.

7. A drying apparatus comprising a channel divided into compartments, the compartment at one end being provided with heating means, and the compartment at the other end provided with an air inlet, means for collecting the vapor driven off from the material, pipes, in which the said vapor condenses, passing through the said compartments, partitions in the compartments dividing the said pipes from the material, openings at the top and bottom of these partitions and fans in the upper openings, all substantially as and for the purposes set forth.

In testimony whereof we have signed our names to this specification in the presence of two subscribing witnesses.

G. J. MÖLLER.
P. PFEIFER.

Witnesses:
  RICHARD SCHMIDT,
  MAX BIENERT.